(12) United States Patent
Tsai

(10) Patent No.: US 8,181,664 B2
(45) Date of Patent: May 22, 2012

(54) RELEASING VALVE FOR AN INFLATABLE OBJECT

(75) Inventor: Chun-Chung Tsai, Dongguan (CN)

(73) Assignee: Dongguan Tiger Point, Metal & Plastic Products Co., Ltd., Ha Kong, Chang An County, Dongguan, Guang Dong Province (CN)

( * ) Notice: Subject to any disclaimer, the term of this patent is extended or adjusted under 35 U.S.C. 154(b) by 250 days.

(21) Appl. No.: 12/800,103

(22) Filed: May 7, 2010

(65) Prior Publication Data
US 2011/0272609 A1     Nov. 10, 2011

(51) Int. Cl.
*F16K 15/20* (2006.01)

(52) U.S. Cl. ........ 137/223; 137/522; 137/856; 137/382; 251/92

(58) Field of Classification Search .................. 137/223, 137/226, 232, 233, 241, 246, 286, 287, 382, 137/467, 522, 523, 843, 855, 856; 251/90, 251/92; 141/226, 227, 231
See application file for complete search history.

(56) References Cited

U.S. PATENT DOCUMENTS

| | | | | |
|---|---|---|---|---|
| 3,808,981 A | * | 5/1974 | Shaw | 410/119 |
| 6,135,143 A | * | 10/2000 | Po | 137/512.15 |
| 6,138,711 A | * | 10/2000 | Lung-Po | 137/527.8 |
| 6,823,905 B1 | * | 11/2004 | Smith et al. | 141/68 |
| 7,401,619 B2 | * | 7/2008 | Song et al. | 137/223 |

* cited by examiner

*Primary Examiner* — Len Tran
*Assistant Examiner* — Reinaldo Sanchez-Medina
(74) *Attorney, Agent, or Firm* — Charles E. Baxley

(57) ABSTRACT

A releasing valve for an inflatable object has a body, a valve disk and a cap. The body is body and has a passage and a disk mount. The passage is defined through the body and has a bottom opening. The valve disk is attached securely to the bottom of the body to close the bottom opening of the passage and has a mounting end and a free end. The mounting end is mounted securely on the disk mount of the body. The free end is opposite to the mounting end. The cap is attached to the body around the bottom opening, holds the valve disk inside and has a stop. The stop selectively engages the free end of the valve disk when the valve disk being pushed away from the bottom opening for discharging air out from the inflating object via the releasing valve.

13 Claims, 4 Drawing Sheets

RELEASING VALVE FOR AN INFLATABLE OBJECT

BACKGROUND OF THE INVENTION

1. Field of the Invention

The present invention relates to a releasing valve, and more particularly to a releasing valve for an inflatable object to flat the inflatable object conveniently and smoothly.

2. Description of Related Art

An inflatable object, such as a swim ring, a pneumatic boat, an inflating toy or furniture has to be inflated for use. When the inflatable object is flatted, the inflatable object is easily and conveniently stored and carried. To flat an inflated object, a releasing valve is always mounted on an inflatable object to discharge air out of the object via the releasing valve. The conventional releasing valve has a valve disk closing a passage in the releasing valve. When the valve disk is pushed away from the passage, the air in the inflated object can be discharged from the object via the passage of the releasing valve.

However, during the air discharging via the releasing valve, the air pressure will apply a force to the valve disk to push the valve disk to a position where closes the passage. Therefore, a user has to keep pushing the valve disk away from the passage for discharging otherwise the valve disk will close the passage automatically before the object being completely flatted. Additionally, the valve disk may also be pushed to the closing condition by the flatted object. Therefore, the conventional releasing valve is inconvenient in use.

To overcome the shortcomings, the present invention tends to provide a releasing valve to mitigate or obviate the aforementioned problems.

SUMMARY OF THE INVENTION

The main objective of the invention is to provide a releasing valve for an inflatable object to flat the inflatable object conveniently and smoothly.

The releasing valve has a body, a valve disk and a cap. The body is body and has a bottom, a passage and a disk mount. The passage is defined through the body and has a bottom opening defined in the bottom of the body. The disk mount is formed on the bottom of the body. The valve disk is attached securely to the bottom of the body to close the bottom opening of the passage and has a mounting end and a free end. The mounting end is mounted securely on the disk mount of the body. The free end is opposite to the mounting end. The cap is attached to the body around the bottom opening, holds the valve disk inside and has a stop. The stop selectively engages the free end of the valve disk when the valve disk being pushed away from the bottom opening of the body for discharging air out from the inflating object via the releasing valve.

Other objects, advantages and novel features of the invention will become more apparent from the following detailed description when taken in conjunction with the accompanying drawings.

DETAILED DESCRIPTION OF PREFERRED EMBODIMENT

Figure 1:
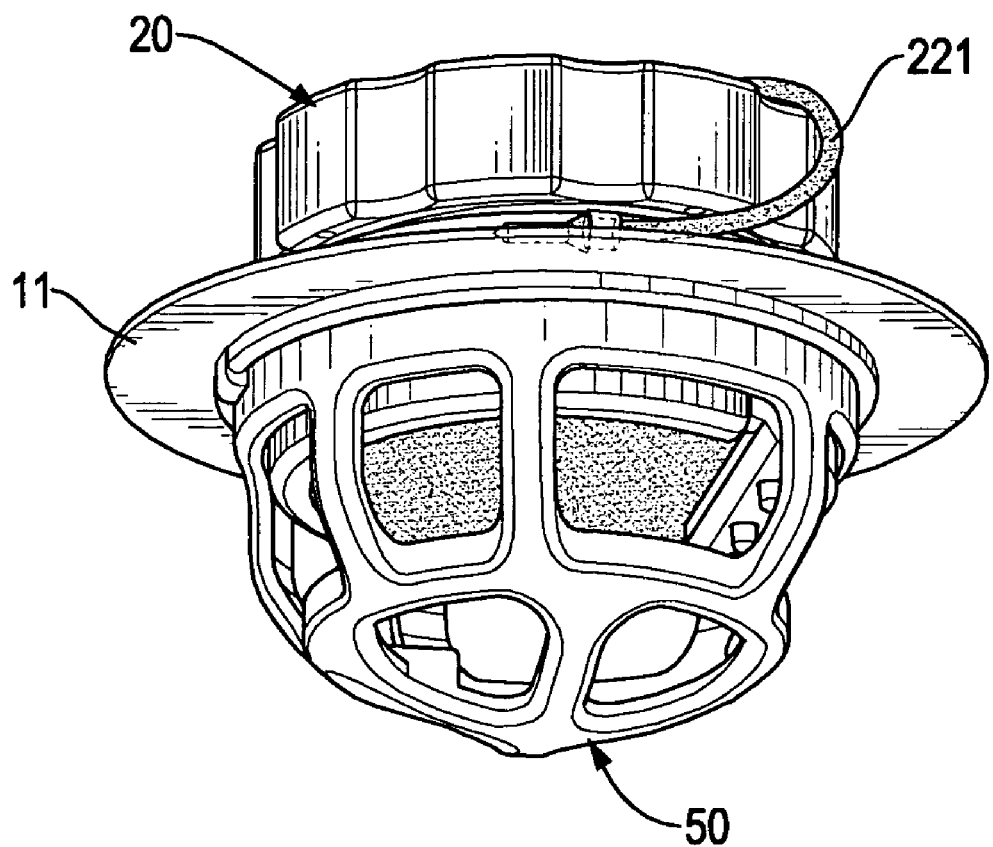
FIG. 1 is a perspective view of a releasing valve in accordance with the present invention.
Figure 2:
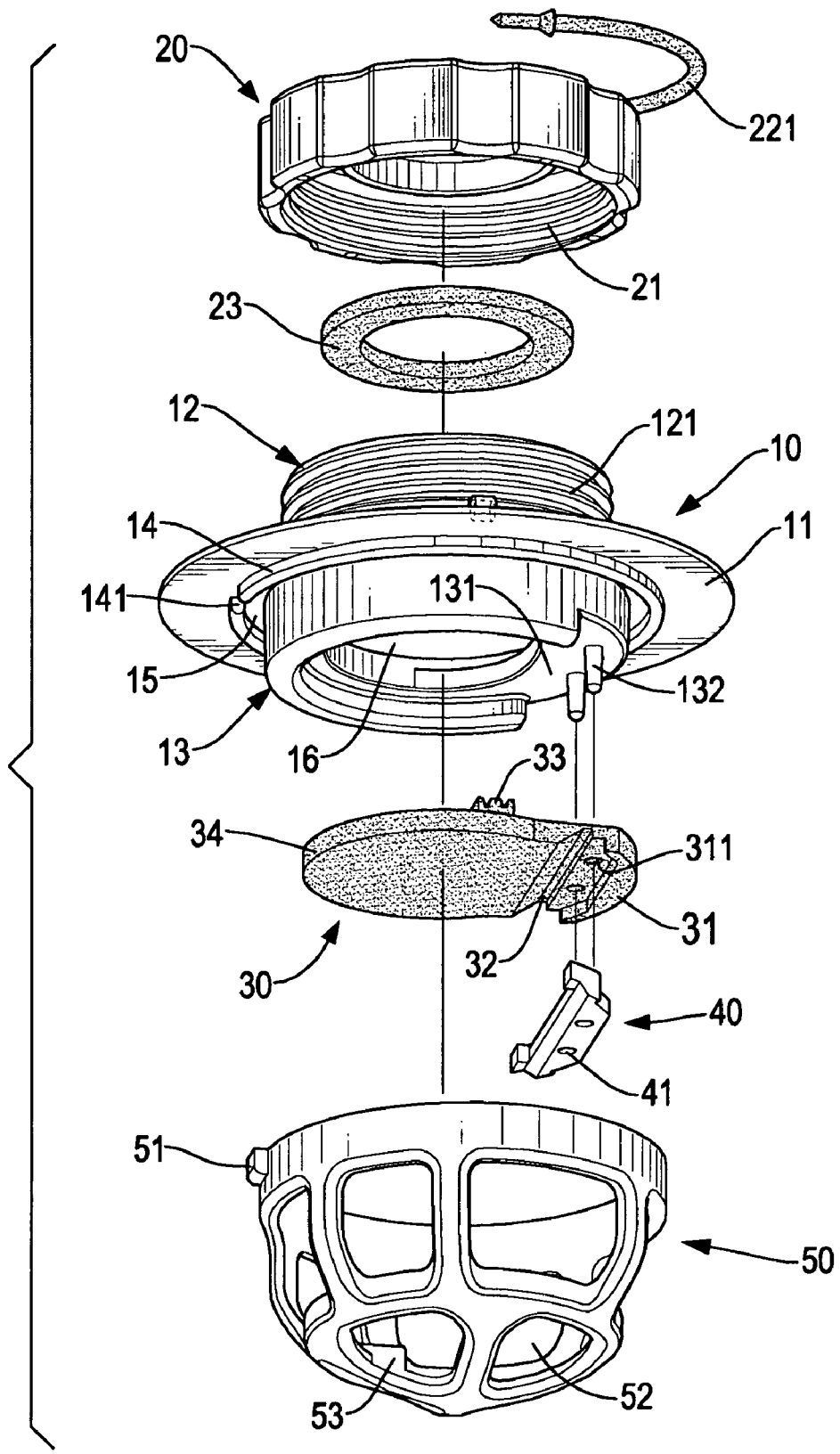
FIG. 2 is an exploded perspective view of the releasing valve in FIG. 1.
Figure 3:
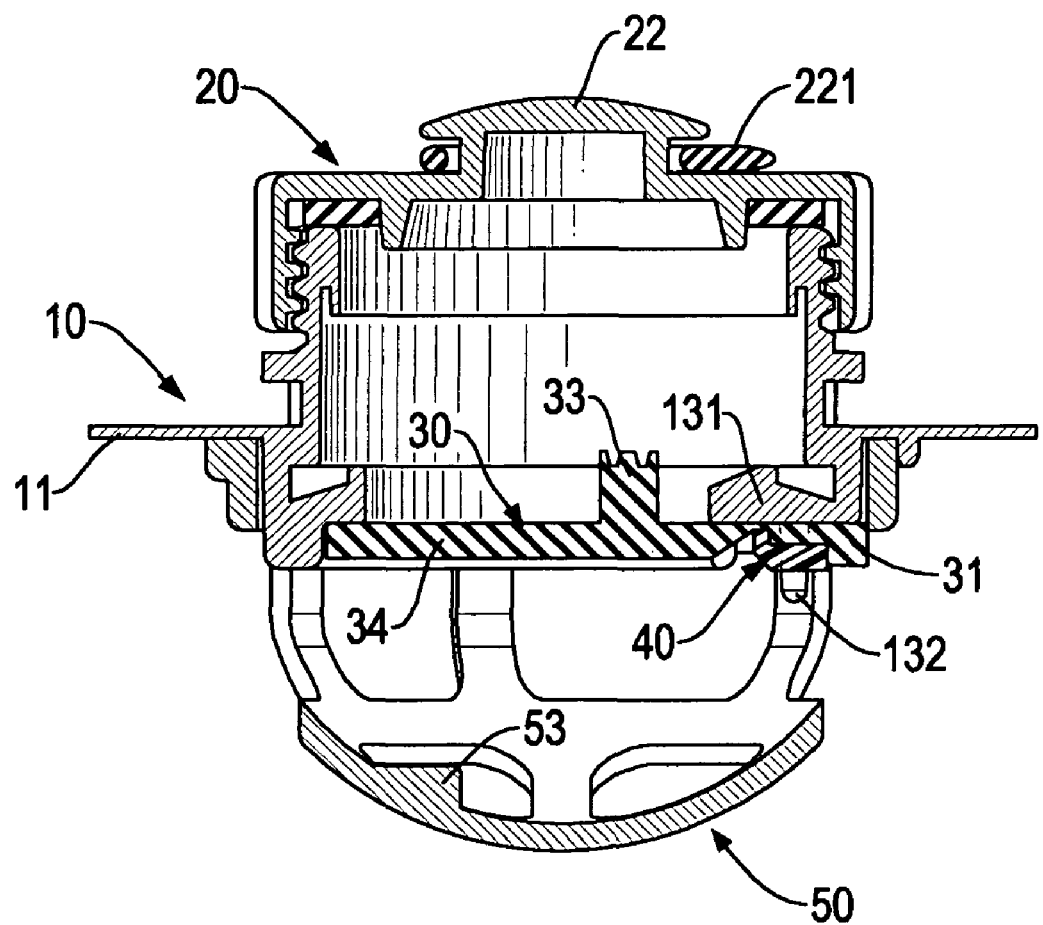
FIG. 3 is a cross sectional side view of the releasing valve in FIG. 1 in a closing condition.

With reference to FIGS. 1 to 3, a releasing valve for an inflatable object in accordance with the present invention comprises a body (10), a cover (20), a valve disk (30), a fixing element (40) and a cap (50).

The body (10) is hollow, may be tubular and has an outer surface, a passage (16), a disk mount (131) and an annular flange (11). The passage (16) is defined through the body (10) and has a bottom opening (13) defined in the bottom of the body (10) and a top opening (12) defined in the top of the body (10). The disk mount (131) is formed on the bottom of the body (10), extends partially into the bottom opening (13) and has at least one mounting post (132) formed on and protruding from the disk mount (131). Preferably, two mounting posts (132) are implemented. The annular flange (11) is formed around and protrudes from the outer surface of the body (10), is connected to the inflatable object and has a bottom face facing to the bottom of the body (10) and an annular rib (14). The annular rib (14) is formed on the bottom face of the annular flange (11) and around the outer surface the body (10) to define an annular recess (15) between the annular rib (14) and the outer surface of the body (10). The annular rib (14) further has a positioning notch (141) defined through the annular rib (14).

The cover (20) is mounted on the top of the body (10) in a thread manner. Preferably, the body (10) has an outer thread (121) formed on the outer surface around the top opening (12), and the cover (20) has an inner thread (21) engaging the outer thread (121) on the body (10). The cover (20) has a connection segment (22) formed on and protruding from the top of the cover (20) and a connecting element (221) connected between the connection segment (22) and the body (10) to keep the cover (20) from falling or escaping from the body (10). The cover (20) further has an O-ring (23) mounted in the cover (10) and around the top opening (12) of the body (10) to provide a sealing effect to the top opening (12) of the body (10).

The valve disk (30) is rubber, is attached securely to the bottom of the body (10) with the fixing element (40) to close the bottom opening (13) of the passage (16) and has a mounting end (31), a free end (34), a bending groove (32) and a pulling post (33). The mounting end (31) is mounted securely on the disk mount (131) of the body (10) and has at least one mounting hole (311). Preferably, two mounting holes (311) are implemented. The mounting holes (311) are defined through the mounting end (31) of the valve disk (30) and are mounted respectively around the mounting posts (132) on the body (10) to attach the mounting end (31) of the valve disk (30) onto the disk mount (131) on the body (10). The free end (34) is opposite to the mounting end (31). The bending groove (32) is defined in a side face of the valve disk (30) opposite to the bottom of the body (10) and is adjacent to the mounting end (31) to make the valve disk (30) bendable at the bending groove (32). The pulling post (33) is formed on and protrudes from a side face of the valve disk (30) facing the bottom of the body (10).

The fixing element (40) is attached to the bottom of the body (10) to mount the valve disk (30) on the disk mount (131) and to squeeze the mounting end (31) of the valve disk (30) between the disk mount (131) and the fixing element (40). The fixing element (40) has at least one mounting hole (41) mounted respectively around the at least one mounting post (132) on the disk mount (131) of the body (10). Preferably, two mounting holes (41) are implemented. Each mounting post (132) is mounted through the corresponding mounting holes (311,41) in the valve disk (30) and the fixing element (40) in sequence.

The cap (50) is attached to the body (10) around the bottom opening (13), is contained in the inflatable object, holds the valve disk (30) inside and has an edge, a positioning block (51), multiple vents (52) and a stop (53). The edge of the cap (50) is formed around the top of the cap (50) and is mounted securely in the annular recess (15) in the body (10) to attach the cap (50) securely to the body (10). The positioning block (51) is formed on the cap (50) adjacent to the edge and engages the positioning notch (141) in the annular rib (14). With the engagement of the positioning block (51) and the notch (141), the combination between the cap (50) and the body (10) can be enhanced. The positioning block (51) and the positioning notch (141) also provide a guiding effect to assemble the cap (50) onto the body (10). The vents (52) are defined through the cap (50) to allow the air in the inflatable object entering into the cap (50) via the vents (52). The stop (53) is formed on the inner surface of the cap (50) and selectively engages the free end (34) of the valve disk (30) when the valve disk (30) being pushed away from the bottom opening (13) of the body (10) for discharging air out from the inflating object via the releasing valve.

Figure 4:
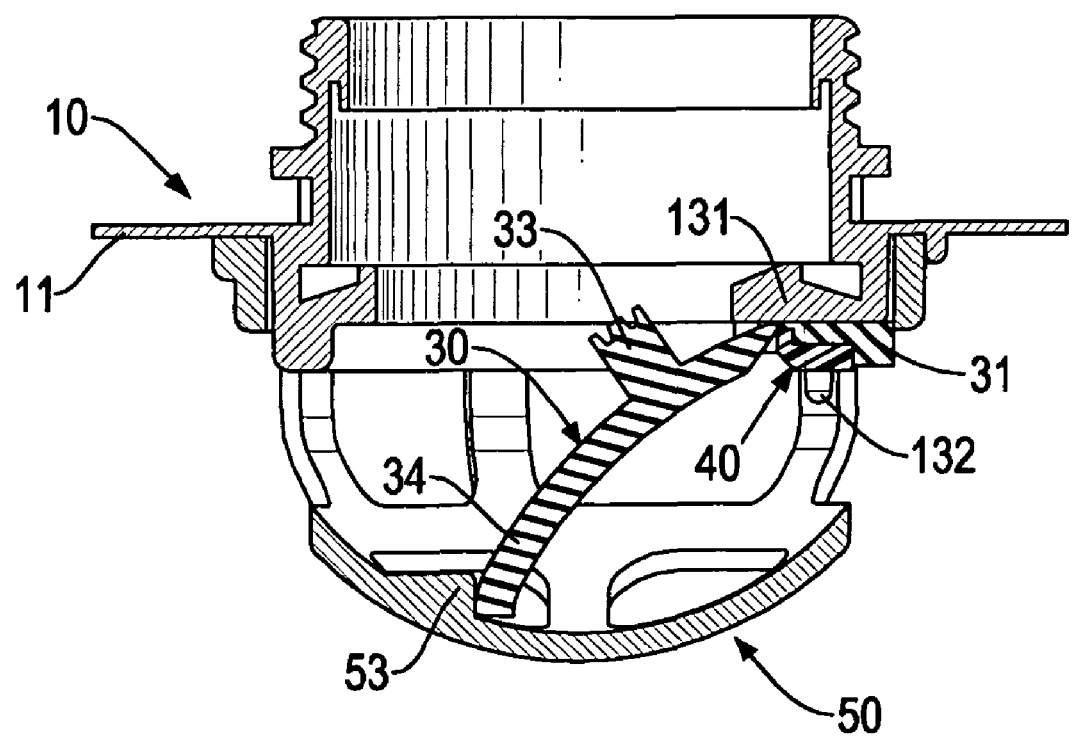
FIG. 4 is a cross sectional side view of the releasing valve in FIG. 1 in a discharging condition.

To discharge air from and flat the inflatable object, with reference to FIGS. 2 and 4, the cover (20) is detached from the body (10) to open the top opening (12). The valve disk (30) is then pushed to make the free end (34) away from the bottom opening (13) of the body (10). Accordingly, the air in the object can be discharged from the top opening (12) via the vents (52) in the cap (50) and the bottom opening (13) and the passage (16) in the body (10). At this time, the free end (34) of the valve disk (30) is engaged the stop (53) in the cap (50), so the valve disk (30) can be kept at the discharging condition even that the pressure of the discharging air applying a force to push against the valve disk (30). Consequently, the air in the object can be continuously discharged until the object is completely flatted, such that the air-discharging process is continuous and smooth. Additionally, with the valve disk (30) held in the cap (50), the valve disk (30) can be prevented from contacting with the flatted object. Therefore, the valve disk (30) is kept from moving to the closing condition by the flatted object during the air-discharging process.

After the object is completely flatted, the valve disk (30) can be moved/pivoted to the closing condition as shown in FIG. 3 by pulling the pulling post (33) on the valve disk (30). Accordingly, the operation of the releasing valve is easy and convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A releasing valve for an inflating object comprising:
    a hollow body having
        a bottom;
        a passage defined through the body and having a bottom opening defined in the bottom of the body; and
        a disk mount formed on the bottom of the body;
    a valve disk attached securely to the bottom of the body to close the bottom opening of the passage and having
        a mounting end mounted securely on the disk mount of the body; and
        a free end opposite to the mounting end; and
    a cap attached to the body around the bottom opening, holding the valve disk inside and having a stop selectively engaging the free end of the valve disk when the valve disk being pushed away from the bottom opening of the body for discharging air out from the inflating object via the releasing valve.

2. The releasing valve as claimed in claim 1, wherein the body is tubular and further has
    an annular flange formed around and protruding from an outer surface of the body and having a bottom face facing to the bottom of the body; and
    an annular rib formed on the bottom face of the annular flange and around the outer surface of the body to define an annular recess between the annular rib and the outer surface of the body;
    the passage further has a top opening defined in a top of the body; and
    the cap has an edge mounted securely in the annular recess between the annular rib and the outer surface of the body.

3. The releasing valve as claimed in claim 2, wherein the annular rib on the body further has a positioning notch defined through the annular rib; and
    the cap further has a positioning block formed on the cap and engaging the positioning notch in the annular rib.

4. The releasing valve as claimed in claim 3 further comprising a cover mounted on the top of the body in a thread manner and a fixing element attached to the bottom of the body to mount the valve disk on the disk mount, wherein
    the body further has at least one mounting post formed on and protruding from the disk mount; and
    the valve disk further has at least one mounting hole defined through the valve disk and mounted respectively around the at least one mounting post on the body.

5. The releasing valve as claimed in claim 4, wherein the fixing element further has at least one mounting hole mounted respectively around the at least one mounting post on the body; and
    the valve disk is squeezed between the disk mount of the body and fixing element.

6. The releasing valve as claimed in claim 5, wherein the valve disk has a bending groove defined in one side face of the valve disk adjacent to the mounting end to make the valve disk bendable at the bending groove.

7. The releasing valve as claimed in claim 6, wherein the cover has a connection segment and a connecting element connected between the connection segment and the body.

8. The releasing valve as claimed in claim 7, wherein the cover further has an O-ring mounted in the cover and around the body.

9. The releasing valve as claimed in claim 8, wherein the valve disk further has a pulling post formed on and protruding from a side face of the valve disk facing the bottom of the body.

10. The releasing valve as claimed in claim 4, wherein the valve disk has a bending groove defined in one side face of the valve disk adjacent to the mounting end to make the valve disk bendable at the bending groove.

11. The releasing valve as claimed in claim 4, wherein the cover has a connection segment and a connecting element connected between the connection segment and the body.

12. The releasing valve as claimed in claim 4, wherein the cover further has an O-ring mounted in the cover and around the body.

13. The releasing valve as claimed in claim 1, wherein the valve disk further has a pulling post formed on and protruding from a side face of the valve disk facing the bottom of the body.

* * * * *